(12) United States Patent
Driever et al.

(10) Patent No.: US 6,687,853 B1
(45) Date of Patent: Feb. 3, 2004

(54) CHECKPOINTING FOR RECOVERY OF CHANNELS IN A DATA PROCESSING SYSTEM

(75) Inventors: Patricia G. Driever, Poughkeepsie, NY (US); John R. Flanagan, Poughkeepsie, NY (US); Paul S. Frazer, Poughkeepsie, NY (US); Catherine C. Huang, Poughkeepsie, NY (US); Bernhard Laubli, Poughkeepsie, NY (US); Louis W. Ricci, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 09/583,670

(22) Filed: May 31, 2000

(51) Int. Cl.[7] .................................................. G06F 11/00
(52) U.S. Cl. .......................................... 714/16; 714/43
(58) Field of Search ................................ 714/16, 43, 4

(56) References Cited

U.S. PATENT DOCUMENTS

| | | | | |
|---|---|---|---|---|
| 3,688,274 A | * | 8/1972 | Cormier et al. ............... | 710/5 |
| 3,736,566 A | * | 5/1973 | Anderson et al. .............. | 714/15 |
| 4,688,221 A | * | 8/1987 | Nakamura et al. .............. | 714/6 |
| 4,912,707 A | * | 3/1990 | Kogge et al. .................. | 714/17 |
| 5,392,425 A | | 2/1995 | Elliott et al. ................. | 395/575 |
| 6,035,424 A | * | 3/2000 | Freerksen et al. ............. | 714/40 |
| 6,519,712 B1 | * | 2/2003 | Kim et al. ..................... | 714/15 |

OTHER PUBLICATIONS

American National Standard of Accredited Standards Commimittee NCITS working draft Fibre Channel Single–Byte Command Code Sets Mapping Protocol—2 (FC–SB–2) Rev. 1.4, May 23, 2000.

* cited by examiner

*Primary Examiner*—Scott Baderman
*Assistant Examiner*—Joshua Lohn
(74) *Attorney, Agent, or Firm*—Floyd A. Gonzalez

(57) ABSTRACT

A method, program product and apparatus for checkpointing for recovery of channels in a data processing system using a protocol which allows for multiplexing operations at the frame level and streaming of commands and data. For unsuccessful retries, the correct primary CCW address is reported back to software indicating the extent to which the channel completed modifying and accessing S/390 storage.

36 Claims, 5 Drawing Sheets

CHECKPOINTING FOR RECOVERY OF CHANNELS IN A DATA PROCESSING SYSTEM

The present invention is related to checkpointing for recovery of channels in a data processing system, and is more particularly related to checkpointing for recovery of channels using a protocol which allows for multiplexing operations at the frame level and streaming of commands and data.

BACKGROUND OF THE INVENTION

In a data processing system, such as the IBM S/390 system having channels whose operation in controlled by Channel Command Words (CCWs), and whose Input/Output (I/O) links are fiber optics using the IBM FICON connectivity architecture, when a channel is attempting to recover from interface errors on the fiber link and the subchannel is in the active state, the channel can attempt retry of the operation from the point of failure by issuing a selective reset with request for retry, specifying which CCW to retry. When, as a conclusion to an unsuccessful retry recovery action, the Interface Control Check (IFCC) status is presented to the S/390 operating system, fields in the Extended Status Word/Extended Report Word (ESW/ERW) must be set up, as explained in IBM Enterprise Systems Architecture/390 Principles of Operation, SA22-7201-06, available from International Business Machines Corporation of Armonk, N. Y. Among these is the primary CCW address which communicates back to the operating system the progress the channel has made through the CCW chain at the time of the error. Based on this information the operating system can determine what storage has been updated for use in its error recovery procedures. On S/390 channels prior to FICON, the protocols only allowed the channel to send the next command in a CCW chain upon receipt of an explicit indication (status or data) that the prior command execution was complete. However FICON protocols allow the channel to stream commands and/or data out to a single device, while simultaneously doing the same for multiple devices.

U.S. Pat. No. 5,392,425 issued Feb. 21, 1995 to Elliott et al for CHANNEL-INITIATED RETRY AND UNIT CHECK FOR PERIPHERAL DEVICES, discloses retrying a command from a CCW in a data processing I/O system having a channel connected to a control unit in which the channel detects an error condition and requests the control unit to retry the current command of an I/O operation.

SUMMARY OF THE INVENTION

The present invention provides a method, program product and apparatus which allows the channel to: 1) manage the data necessary for the recovery of an operation for a single device while multiple devices are active (checkpointing) and 2) determine the correct primary CCW address to report in the IFCC status by tracking and examining relevant checkpoints.

With the implementation of IBM FICON architecture, the channel is allowed to stream multiple commands out to a control unit without waiting for positive confirmation that any of the preceding commands are complete. In addition, this may occur for multiple devices simultaneously. An object of the present invention is to track within the FICON channel, the progress of CCWs through their various stages, so that when an error is detected and an operation is aborted, the channel can properly select which CCW to attempt to retry with the control unit and for unsuccessful retries to report back to software the correct primary CCW address indicating the extent to which the channel completed modifying and accessing S/390 storage. FICON architecture establishes two checkpointing events: if the CCW is a 'Read' with a non-zero byte count, or the CCW flags contain Program Controlled Interruption (PCI), a checkpoint is established between the channel and control unit for that CCW number.

It is also an object of the present invention to implement checkpointing concepts in a manner that has minimal impact on functional performance, tracking only the minimal data needed during normal operation and using that data in lengthier analysis performed during error recovery. This data is tracked on a 'per operation' basis so that many operations can be concurrently ongoing, and utilizes the architectural concept of CCW numbering for each CCW in a chain.

These and other objects will be apparent to one skilled in the art from the following drawings and detailed description of the invention.

DESCRIPTION OF THE PREFERRED EMBODIMENT

Figure 1:
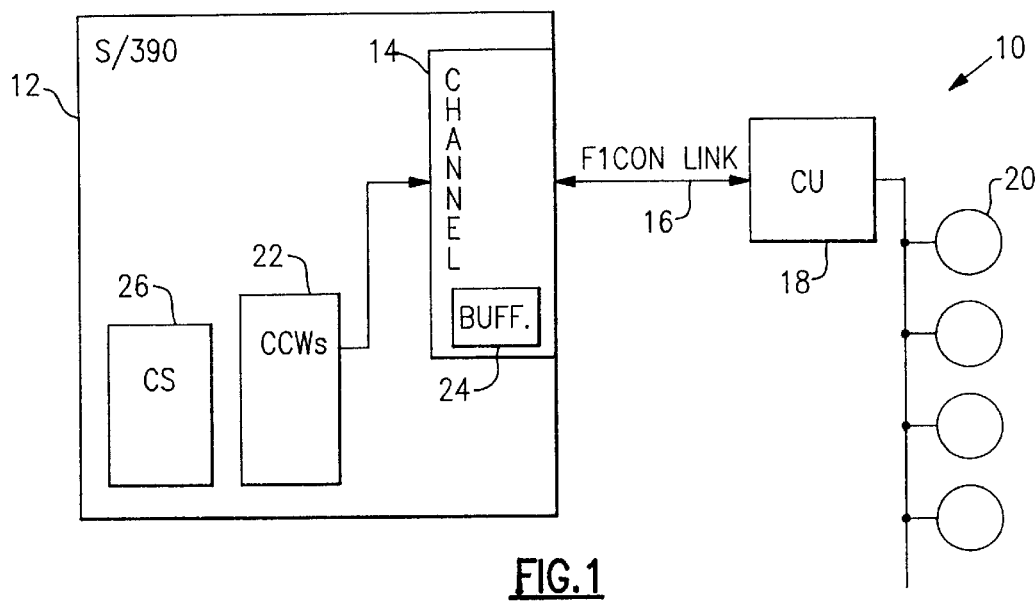
FIG. 1 is a schematic drawing of a data processing system usable with the present invention.

FIG. 1 is a schematic drawing of a data processing system 10 usable with the present invention. The data processing system includes a central processing unit 12 which, in the present embodiment may be an IBM S/390 computer, having a channel subsystem (CSS) 14 which includes a channel connected by a link 16 to a control unit 18 which controls a multiplicity of I/O devices 20. The link 16 in the present embodiment is an IBM FICON link over which data and commands are sent in frames without waiting for a response to each frame sent. FICON is the IBM version of the FC4 upper layer protocol of the draft standard set forth in T11/PROJECT 1357-D/Rev 1.2, FIBRE CHANNEL Single-Byte Command Code Sets—2 Mapping Protocol (FC-SB-2) available from the T 11 Technical Committee (web site at http://www.t11.org) under Accredited Standards Committee, National Committee for Information Technology Standardization which in turn operates under the procedures of the American National Standards Institute. As is well known in the art, data is sent between the CSS 14 and the control unit 18 by Channel Command Words (CCWs) 22. The CCW specifies the command to be executed and, for commands initiating certain I/O operations, it designates the storage area associated with the operation, the action to be taken whenever transfer to or from the area is completed, and other options. The CCW and its use is well understood, and is fully explained in the aforementioned Principles of Operation, and will not be explained further. When data is read from an I/O device in 20, the data is read into buffers 24 in the CSS 14, and then is further stored in S/390 memory or customer storage 26 of the computer 12. As indicated in the aforementioned Principles of Operation, the IFCC indicates that an invalid signal has occurred on the channel path. If an error occurs in the transfer, the present invention determines the extent to which the transfer is complete, how much, if any, customer storage 26 has been altered, and the point in the CCW chain to attempt command retry. This is further complicated because a number of CCWs may be executed in the FICON architecture without waiting for one CCW to be completed before starting another CCW.

This data is tracked on a 'per operation' basis so that many operations can be concurrently ongoing, and utilizes the architectural concept of CCW numbering for each CCW in a chain. In the present invention, functional code is written in accordance with the aforementioned FC-SB-2 proposed standard and keeps track of four CCW numbers for each operation that are relevant to checkpointing and recovery. The four CCW numbers are:

Last-completed—this CCW number is updated when all of the READ data for a given CCW is received on the link and has been successfully stored in S/390 storage or the PCI interrupt has been sent back to the operating system. As specified in the aforementioned Principles of Operation, the PCI function permits the program to cause an I/O interruption during execution of an I/O operation. The function is controlled by the PCI flag of the CCW. Neither the value of the PCI flag nor the associated interruption request affects the execution of the current operation.

Last-received—this CCW number is updated when some or all of the READ data for a given CCW is received on the link and put on the storage queue, or the Command Response (CMR) for a PCI has been received and put on the storage queue, but confirmation has not yet been made of the data having been stored or PCI interrupt condition having been generated.

Last-expected—this CCW number is updated when a non-zero byte count READ or PCI CCW has been processed to the point where the command was sent, but nothing has been received off the link yet in response.

Last-assigned—this CCW number is updated when any CCW (not just Reads or PCI) is processed and sent out.

The relationship between these four CCW numbers is always such that (not including CCW number wrapping):

Last-completed<=Last-received;
Last-received<=Last-expected; and
Last-expected<=Last-assigned;

noting that at some point, two, three, or all four of the numbers may be equal. In the following examples, CCW number values are initialized to '01', the first CCW in the chain. The direction of the arrows in the following examples indicate the direction of the last command or data, left-to-right is a message from the S/390 system to the control unit, and right-to-left is a message from the control unit to the S/390 system. For determining primary CCW address, there are three relevant cases to be considered:

CASE 1

Last-completed=Last-received=Last-expected

For Case 1 there are no more expected checkpointing events beyond the last received checkpoint, so the channel will allow the control unit to retry from whichever CCW it was processing at the time of the error. However if retry is unsuccessful, then for the purpose of reporting back the channel's progress to the operating system, the primary CCW address would be that of Last-assigned, since we have returned to the operating system all relevant data from any checkpointing event, and no subsequent CCWs sent after that point (if any, since Last-assigned may also equal Last-expected) contain checkpointing events.

EXAMPLE 1

|  | Last-assigned | Last-expected | Last-received | Last-completed |
|---|---|---|---|---|
| Write (CCW #01) → | 01 | 01 | 01 | 01 |
| Read (CCW #02) → | 02 | 02 | 01 | 01 |
| Write (CCW #03) → | 03 | 02 | 01 | 01 |
| Read data received & placed on storage queue ← | 03 | 02 | 02 | 01 |
| Write - PCI (CCW #04) → | 04 | 04 | 02 | 01 |
| Write (CCW #05) → | 05 | 04 | 02 | 01 |
| Read data stored in S/390 ← | 05 | 04 | 02 | 02 |
| CMR for PCI received ← | 05 | 04 | 04 | 02 |
| Write (CCW #06) → | 06 | 04 | 04 | 02 |
| PCI sent to S/390 ← | 06 | 04 | 04 | 04 |

********ERROR ENCOUNTERED AT THIS POINT***********

In example 1, the control unit could choose to retry either CCW #04 or #05 or #06.

CASE 2

Last-completed=Last-received

For case 2, since we are still waiting for a checkpointing event response from the control unit, but have stored away everything for prior checkpointing events for which we have received anything, for the purpose of retry the channel would request that the control unit retry the last known good checkpoint (Last-received). However to determine the primary CCW address if retry is unsuccessful we must inspect the CCW chain between Last-received and Last-expected. If at any point we find another checkpointing event, the CCW address of the CCW number prior to this next expected checkpoint is used as the primary CCW address. If we reach Last-expected without finding another checkpointing event, then the CCW address prior to that is used as the primary CCW address.

EXAMPLE 2

|  | Last-assigned | Last-expected | Last-received | Last-completed |
|---|---|---|---|---|
| Write (CCW #01) → | 01 | 01 | 01 | 01 |
| Read (CCW #02) → | 02 | 02 | 01 | 01 |
| Write (CCW #03) → | 03 | 02 | 01 | 01 |
| Read data received & placed on storage queue (CCW #2) ← | 03 | 02 | 02 | 01 |
| Write - PCI (CCW #04) → | 04 | 04 | 02 | 01 |
| Write (CCW #05) → | 05 | 04 | 02 | 01 |
| Read data stored in S/390 (CCW #2) ← | 05 | 04 | 02 | 02 |
| Read (CCW #06) → | 06 | 06 | 02 | 02 |
| Write (CCW #07) → | 07 | 06 | 02 | 02 |

********ERROR ENCOUNTERED AT THIS POINT************

In example 2, inspecting the CCWs between #02 and #06 results in finding the next checkpointing event to be at CCW #04. Since this checkpoint was not completed, the channel would request retry of the last known good checkpoint (CCW #02). In the event retry is unsuccessful and IFCC status is to be reported, the primary CCW address is found by backing up one CCW from the next incomplete checkpoint, hence using the address of CCW #03.

CASE 3

Last-completed≠Last-received

In case 3, for the purpose of deciding which CCW to retry across the fiber link, the channel must again go back to the last known good checkpoint. However since we do not have positive confirmation that data was stored in S/390 memory or PCI was sent back, both the retry CCW number and the primary CCW address would be that of the next checkpointing CCW after Last-completed. This is due to the fact that at least some of the READ data may have been stored to S/390 storage, and the primary CCW address must indicate this. Since Last-received is the LAST of such events, not necessarily the NEXT one, we need to inspect the CCW chain from Last-completed through Last-received. If at any point another checkpointing event is encountered, that CCW number is used as the retry CCW number, and the CCW address corresponding to that CCW number for retry failures is used as the primary CCW address. If no more checkpointing events are encountered prior to reaching Last-received, then that CCW address is used.

EXAMPLE 3

|  | Last-assigned | Last-expected | Last-received | Last-completed |
|---|---|---|---|---|
| Write (CCW #01) → | 01 | 01 | 01 | 01 |
| Read (CCW #02) → | 02 | 02 | 01 | 01 |
| Write (CCW #03) → | 03 | 02 | 01 | 01 |
| Read data received & placed on storage queue (CCW #2) ← | 03 | 02 | 02 | 01 |
| Write - PCI (CCW #04) → | 04 | 04 | 02 | 01 |
| Write (CCW #05) → | 05 | 04 | 02 | 01 |
| PCI received (CCW #04) ← | 05 | 04 | 04 | 01 |

********ERROR ENCOUNTERED AT THIS POINT************

In example 3, inspecting the CCWs between #01 and #04 results in finding a checkpointing event in CCW #02, for which data has been received, but not necessarily all stored. In this case CCW #02 is used as the retry CCW number and the address of CCW #02 is used as the primary CCW address for the retry failure IFCC reporting.

Figure 2B:
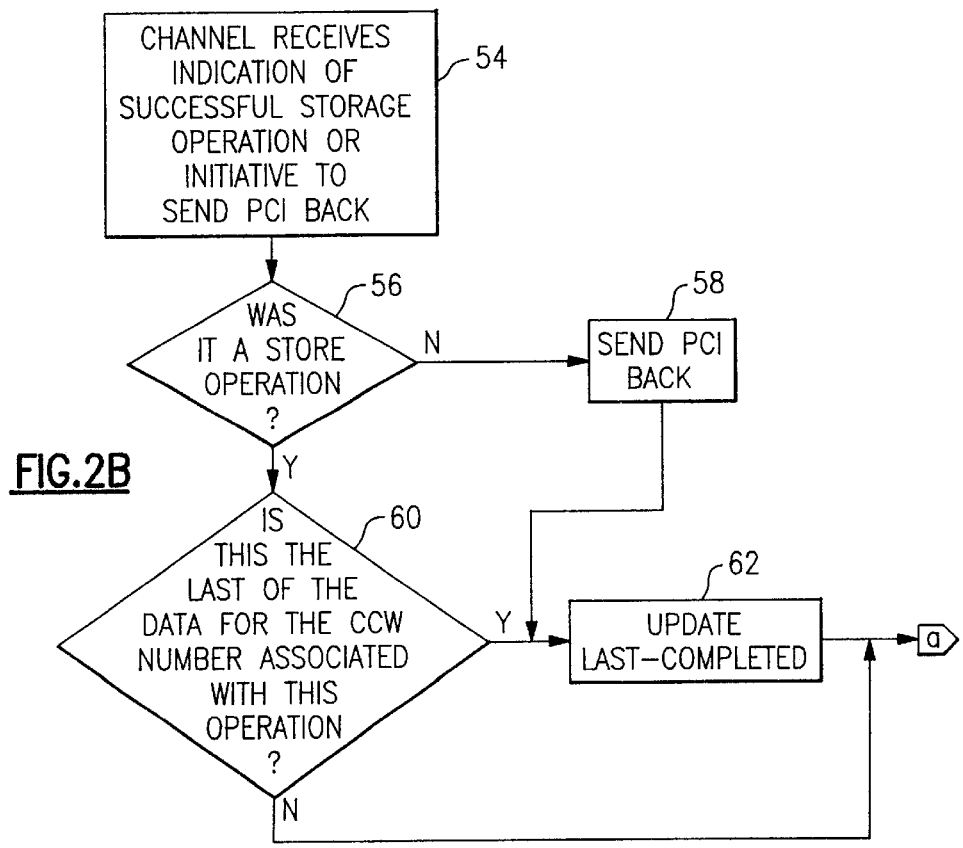
FIGS. 2A and 2B, joined at connector a, form a flowchart of a computer program for determining how checkpointing values are set.
Figure 2A:
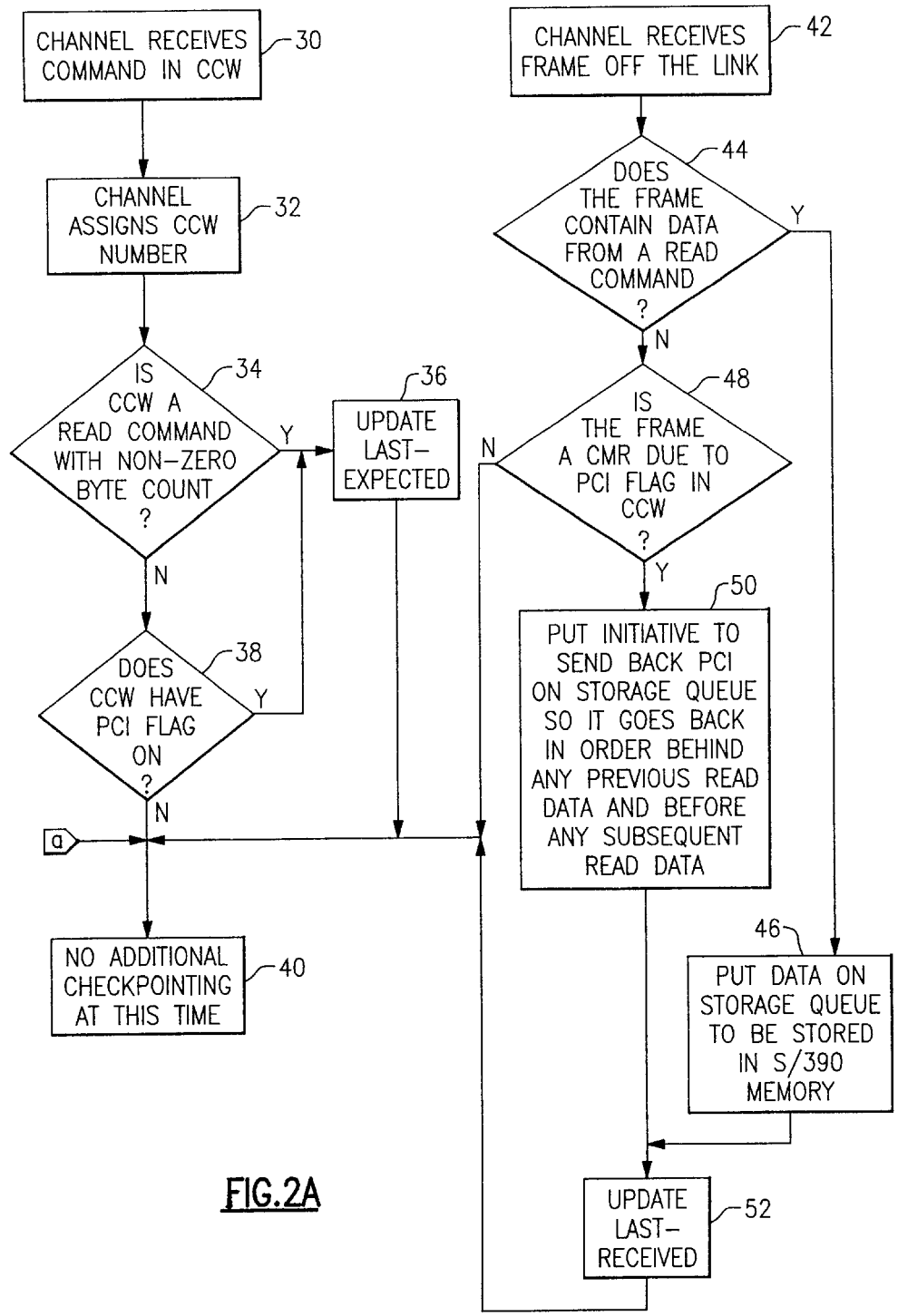

FIGS. 2A and 2B, joined at connectors a, form a flowchart of a computer program for determining how checkpointing values are set. If the channel 14 receives a command or data from the link 16, the program goes to one of 30, 42, or 54, depending on what was received by the channel, as will be discussed. In FIG. 2A, if a command in the CCW is received at 30, the channel assigns a CCW number at 32. A check is made at 34 to determine if the CCW is a Read command with a non-zero byte count. If yes, the Last-expected is updated at 36. If the check at 34 is no, a check is made at 38 to see if the CCW has the PCI flag on. If yes, Last-expected is updated at 36. After the Last-expected is updated at 36, or the check is no at 38, the program goes to 40, no additional checkpointing is done at this time, and the next event is awaited. If the channel receives a frame off the link at 42, a check is made at 44 to see if the frame contains data from a Read command. If the check at 44 is yes, at 46 the program puts the data on the storage queue to be stored in the S/390 memory 26. If the check at 44 is no, a check is made at 48 to determine if the frame is a CMR due to a PCI flag in the CCW. CMR is described in the FC-SB-2 proposed standard. If the check is no, the program goes to 40, no additional checkpointing at this time, and awaits the next event. If the check at 48 is yes, the program at 50 puts initiative to send back PCI on the storage queue so it goes back in order behind any previous Read data and before any subsequent Read data. After either 46 or 50, the Last-received is updated at 52, and the program goes to 40, no additional checkpointing at this time, and awaits the next event.

In FIG. 2B, if at 54 the channel receives an indication of a successful storage operation or an initiative to generate a PCI interrupt condition, a check is made at 56 to determine if the indication was a Store operation. If the check at 56 is no, the channel generates a PCI interrupt condition at 58. If the check at 56 is yes, the check is made at 60 to determine if this is the last of the data for the CCW number associated with this operation. If the check at 60 is yes, or a PCI is sent back at 58, Last-completed is updated at 62. If the check at 60 is no, or Last-completed is updated at 62, the program goes to 40, no additional checkpointing at this time, and awaits the next event.

Figure 3:
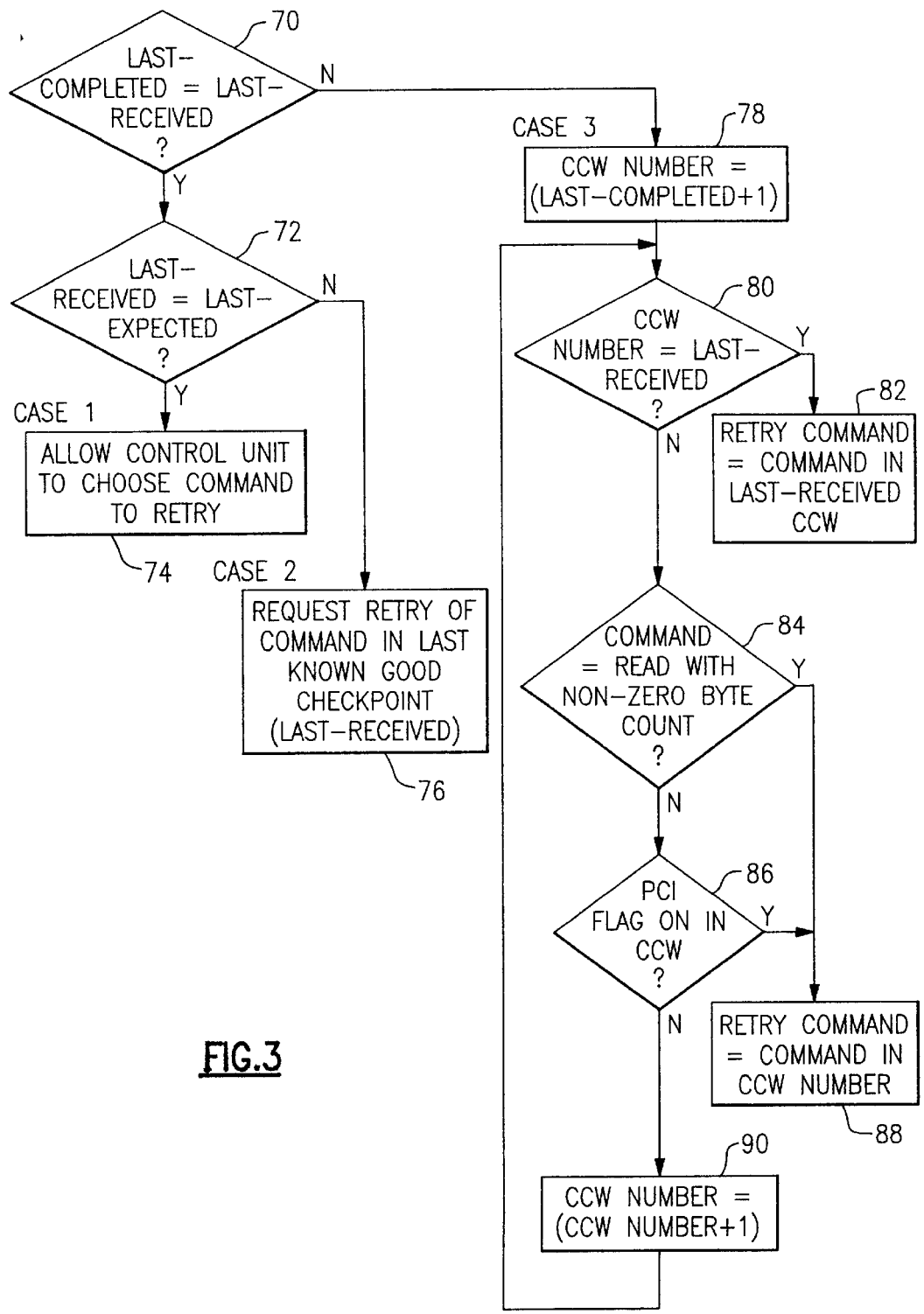
FIG. 3 is a flowchart of a computer program for the analysis of values for determining the command to retry.

FIG. 3 is a flowchart of a compute program for the analysis of values for determining the command to retry. This program is initiated when an error in the operation of a CCW is detected. A check is made at 70 to see if the value determined by the program of FIGS. 2A and 2B for Last-completed is equal to the value determined for Last-received. If the check at 70 is yes, a check is made at 72 to see if the value determined by the program of FIGS. 2A and 2B for Last-received is equal to the value determined for Last-expected. If the check at 72 is yes, the condition of Case 1 is recognized, and at 74 the control unit 18 is allowed to choose the command to retry. If the check at 72 is no, the condition of Case 2 is recognized, and at 76 a request is made to retry the command in the last known good checkpoint, which is the Last-received CCW.

If the check at 70 is no, Case 3 is recognized, and at 78 the CCW number is set equal to Last-completed+1, giving a new CCW number. A check is made at 80 to see if the new CCW number is equal to Last-received. If the check at 80 is yes, at 82 a request is made to retry the command in the Last-received CCW. If the check at 80 is no, a check is made at 84 to see if the command in the new CCW number is Read with a non-zero byte count. If the check at 84 is no, a check is made at 86 to see if the PCI flag is on in the new CCW. If the checks at either 84 or 86 are yes, at 88 a request is made to retry the command in the new CCW number. If the check at 86 is no, at 90a new CCW number is calculated by incrementing the CCW number by one, and the program loops back to 80.

Figure 4A:
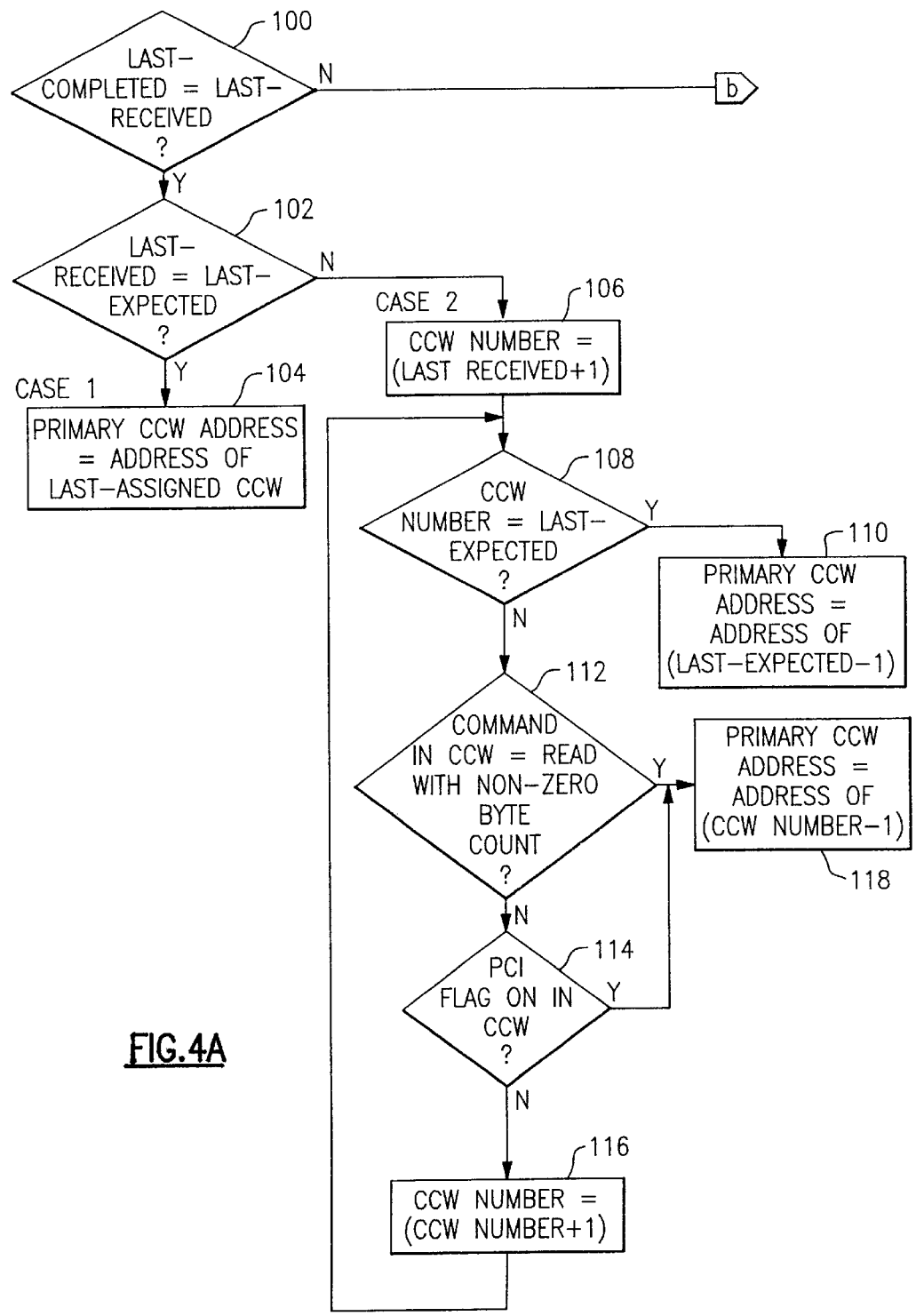
FIGS. 4A and 4B, joined at connector b, form a flowchart of a computer program for the analysis of values for determining the primary CCW address reported back to the operating system on retry failures.
Figure 4B:
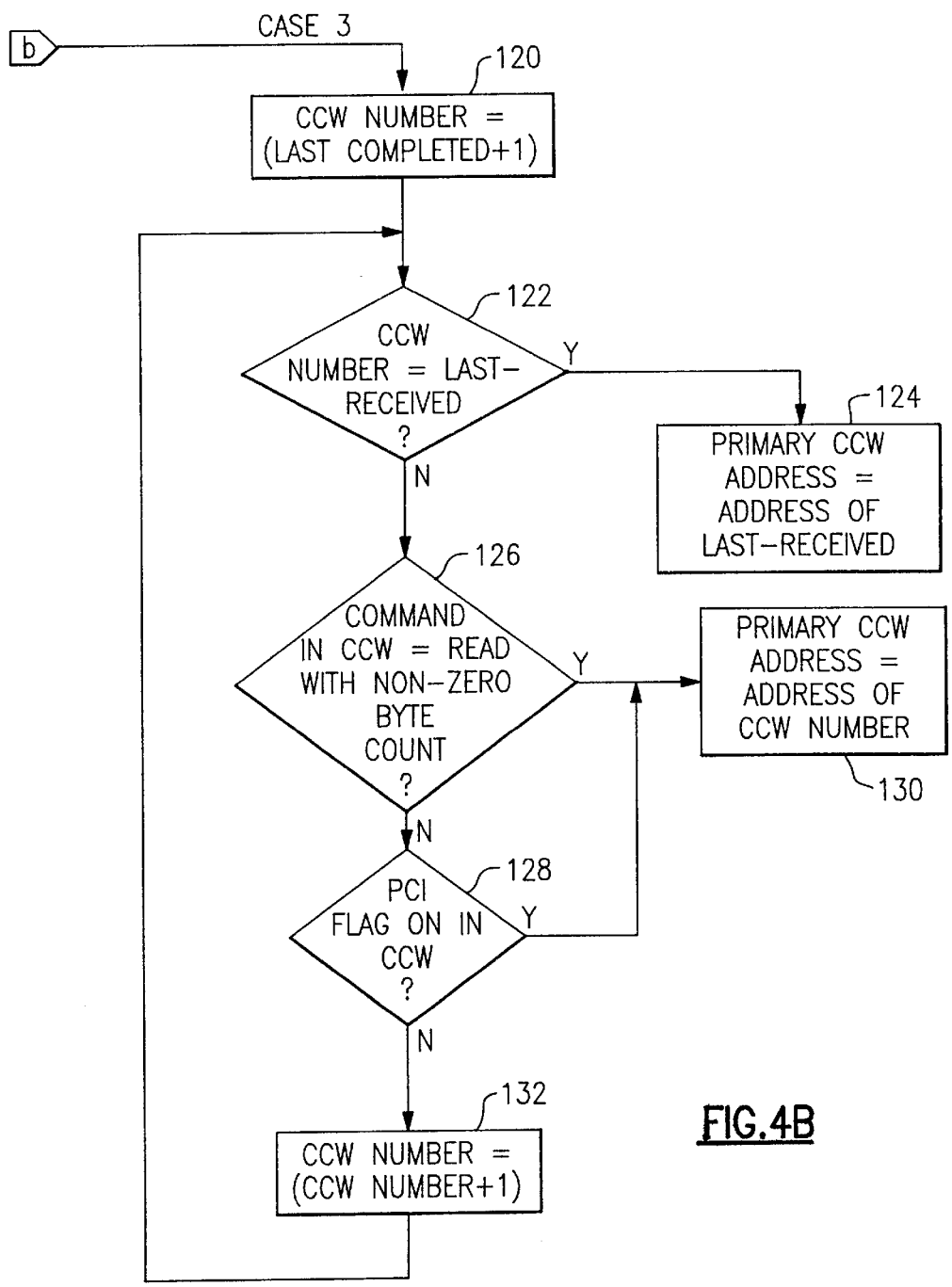

FIGS. 4A and 4B, joined by the connectors b, is a flowchart of a computer program for the analysis of values for determining the primary CCW address reported back to the operating system upon the failure of the retry operation determined by the program of FIG. 3. In FIG. 4A at 100, a check is made to see if the value determined by the program of FIGS. 2A and 2B for Last-completed is equal to the value determined for Last-received. If the check at 100 is yes, a check is made at 102 to see if the value determined by the program of FIGS. 2A and 2B for Last-received is equal to the value determined for Last-expected. If the check at 102 is yes, Case 1 is recognized, and at 104 the primary CCW address is the address of the Last-assigned CCW. This primary address is sent back to the operating system. If the check at 102 is no, Case 2 is recognized, and at 106 a CCW number is calculated equal to Last-received+1. A check is made at 108 to see if the CCW number is equal to Last-expected. If yes, at 110 the primary CCW address sent back to the operating system is equal to the address of Last-expected−1. If the check at 108 is no, a check is made at 112 to see if the command in the CCW number is a Read with a non-zero byte count. If the check is no, a check is made at 114 is see of the PCI flag in on in the CCW number. If the check in either 112 or 114 is yes, the primary CCW address sent back to the operating system is equal to the address of the CCW number−1. If the check at 114 is no, at 116 the CCW number is incremented by one, and the program loops back to 108.

If the check at 100 is no, Case 3 is recognized and at FIG. 4B 120, the CCW number is calculated as equal to Last-completed+1. A check is made at 122 to see if the CCW number is equal to Last-received. If the check at 122 is yes, at 124 the primary CCW number sent to the operating system is the address of Last-received. If the check at 122 is no, a check is made at 126 to see if the command in the CCW number is a Read with a non-zero byte count. If the check at 126 is no, a check is made at 128 to see if the PCI flag is on in the CCW. If either the check at 126 or the check at 128 is yes, at 130 the primary CCW address sent to the operating system is the address of the CCW number. If the check at 128 is no, at 132 the CCW number is incremented by one, and the program loops back to 122. As previously mentioned, the primary CCW is reported back to operating system software indicates the extent to which the channel completed modifying and accessing S/390 storage 26. The primary CCW address tells the operating system the progress of the channel through the CCW chain at the time the operation is being terminated. The operating system then knows, for example, that any Read CCWs after this primary CCW address did not happen, and hence S/390 storage was not altered by these subsequent Reads, if any.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method of checkpointing for recovery of a channel connected to a control unit in a data processing system using a protocol which allows for multiplexing operations at the frame level, said method comprising:

tracking within the channel, the progress of multiple Channel Command Words (CCWs) through their various stages;

detecting when an error occurs and an operation is aborted;

selecting which CCW to attempt to retry based on the progress of the multiple CCWs; and said tracking within the channel includes keeping track of;
the last-completed CCW number,
the last-received CCW number,
the last-expected CCW number, and
the last-assigned CCW number.

2. The method of claim 1 further comprising establishing a checkpoint between the channel and the control unit upon either of the selected CCW being a Read with a non-zero byte count or the selected CCW flags containing a Program Controlled Interruption (PCI).

3. The method of claim 1 wherein, when the last-completed CCW number is equal to the last-received CCW number which is equal to the last-expected CCW number, the CCW selected is allowed to be selected by the control unit.

4. The method of claim 1 wherein, when the last-completed CCW number is equal to the last-received CCW number but the last-received CCW number is not equal to the last-expected CCW number, the selected CCW is the last-received CCW number.

5. The method of claim 1 wherein, when the last-completed CCW number is not equal to the last-received CCW number, the CCW selected is either;

equal to the last-completed CCW number, or the CCW number greater that the last-completed CCW number which is either a Read with a non-zero byte count or which has a PCI flag on.

6. The method of claim 1 further comprising;

retrying the selected CCW; and in the event said selected CCW retry is unsuccessful, determining a primary CCW address indicating the extent to which the channel completed modifying and accessing storage in the data processing system; and reporting to the operating system of said data processing system, said primary CCW address.

7. The method of claim 6 wherein, when the last-completed CCW number equals the last-received CCW number which is equal to the last-expected CCW number, the primary CCW address reported to the operating system is the address of the last-assigned CCW.

8. The method of claim 6 wherein, when the last-completed CCW number is equal to the last-received CCW number but the last-received CCW number is not equal to the last-expected CCW number, the primary CCW address reported to the operating system is either;

the address of the CCW number immediately prior to the last-expected CCW number, or the address of the CCW number which is greater than the last-received CCW number and is the first of such CCW numbers that is either a Read with a non-zero byte count or has a PCI flag on.

9. The method of claim 6 wherein, when the last-completed CCW number is not equal to the last-received CCW number, the primary CCW address reported to the operating system is either;

the address of the last-received CCW number, or the address of the CCW number which is greater than the last-completed CCW number and is the first of such CCW numbers that is either a Read with a non-zero byte count or has a PCI flag on.

10. A computer program product comprising a computer useable medium having computer readable program code means therein for checkpointing for recovery of a channel connected to a control unit in a data processing system using a protocol which allows for multiplexing operations at the frame level, said computer readable program code means in said computer program product comprising:

computer readable program code means for tracking within the channel, the progress of multiple Channel Command Words (CCWs) through their various stages;

computer readable program code means for detecting when an error occurs and an operation is aborted;

computer readable program code means for selecting which CCW to attempt to retry based on the progress of the multiple CCWs; and said computer readable program code means for tracking includes computer readable program code means for keeping track of;

the last-completed CCW number, the last-received CCW number, the last-expected CCW number, and the last-assigned CCW number.

11. The computer program product of claim 10 further comprising computer readable program code means for establishing a checkpoint between the channel and the control unit upon either of the selected CCW being a Read with a non-zero byte count or the selected CCW flags containing a Program Controlled Interruption (PCI).

12. The computer program product of claim 10 further comprising computer readable program code means for, when the last-completed CCW number is equal to the last-expected CCW number which is equal to the last-received CCW number, allowing the CCW to be selected by the connected control unit.

13. The computer program product of claim 10 further comprising computer readable program code means for, when the last-completed CCW number is equal to the last-received CCW number but the last-received CCW number is not equal to the last-expected CCW number, selecting the selected CCW to be the last-received CCW number.

14. The computer program product of claim 10 further comprising computer readable program code means for, when the last-completed CCW number is not equal to the last-received CCW number, selecting the CCW to be either;

equal to the last-completed CCW number, or the CCW number greater that the last-completed CCW number which is either a Read with a non-zero byte count or which has a PCI flag on.

15. The computer program product of claim 10 further comprising;

computer readable program code means for retrying the selected CCW; and computer readable program code means for, in the event said selected CCW retry is unsuccessful, determining a primary CCW address indicating the extent to which the channel completed modifying and accessing storage in the data processing system; and computer readable program code means for reporting to the operating system of said data processing system, said primary CCW address.

16. The computer program product of claim 15 further comprising computer readable program code means for, when the last-completed CCW number equals the last-received CCW number which is equal to the last-expected CCW number, selecting the primary CCW address to be the address of the last-assigned CCW number.

17. The computer program product of claim 15 further comprising computer readable program code means for, when the last-completed CCW number is equal to the last-received CCW number but the last-received CCW number is not equal to the last-expected CCW number, selecting the primary CCW address reported to the operating system to be either;

the address of the CCW number immediately prior the last-expected CCW number, or the address of the CCW number which is greater than the last-received CCW number and is the first of such CCW numbers that is either a Read with a non-zero byte count or has a PCI flag on.

18. The computer program product of claim 15 computer readable program code means for, when the last-completed CCW number is not equal to the last-received CCW number, selecting the primary CCW address reported to the operating system to be either;

the address of the last-received CCW number, or the address of the CCW number which is greater than the last-completed CCW number and is the first of such CCW numbers that is either a Read with a non-zero byte count or has a PCI flag on.

19. An apparatus for checkpointing for recovery of a channel connected to a control unit in a data processing system using a protocol which allows for multiplexing operations at the frame level, said apparatus comprising:

means for tracking within the channel, the progress of multiple Channel Command Words (CCWs) through their various stages;

means for detecting when an error occurs and an operation is aborted;

means for selecting which CCW to attempt to retry based on the progress of the multiple CCWs; and said means for tracking includes means for keeping track of;
- the last-completed CCW number,
- the last-received CCW number,
- the last-expected CCW number, and
- the last-assigned CCW number.

20. The apparatus of claim 19 further comprising means for establishing a checkpoint between the channel and the control unit upon either of the selected CCW being a Read with a non-zero byte count or the selected CCW flags containing a Program Controlled Interruption (PCI).

21. The apparatus of claim 19 wherein, when the last-completed CCW number is equal to the last-received CCW number which is equal to the last-expected CCW number, the CCW selected is allowed to be selected by the control unit.

22. The apparatus of claim 19 wherein, when the last-completed CCW number is equal to the last-received CCW number but the last-received CCW number is not equal to the last-expected CCW number, the selected CCW is the last-received CCW number.

23. The apparatus of claim 19 wherein, when the last-completed CCW number is not equal to the last-received CCW number, the CCW selected is either;

equal to the last-completed CCW number, or the CCW number greater that the last-completed CCW number which is either a Read with a non-zero byte count or which has a PCI flag on.

24. The apparatus of claim 19 further comprising;

means for retrying the selected CCW; and means for, in the event said selected CCW retry is unsuccessful, determining a primary CCW address indicating the extent to which the channel completed modifying and accessing storage in the data processing system; and means for reporting to the operating system of said data processing system, said primary CCW address.

25. The apparatus of claim 24 wherein, when the last-completed CCW number equals the last-received CCW number which is equal to the last-expected CCW number, the primary CCW address reported to the operating system is the address of the last-assigned CCW.

26. The apparatus of claim 24 wherein, when the last-completed CCW number is equal to the last-received CCW number but the last-received CCW number is not equal to the last-expected CCW number, the primary CCW address reported to the operating system is either;

the address of the CCW number immediately prior to the last-expected CCW number, or the address of the CCW number which is greater than the last-received CCW number and is the first of such CCW numbers that is either a Read with a non-zero byte count or has a PCI flag on.

27. The apparatus of claim 24 wherein, when the last-completed CCW number is not equal to the last-received CCW number, the primary CCW address reported to the operating system is either;

the address of the last-received CCW number, or the address of the CCW number which is greater than the last-completed CCW number and is the first of such CCW numbers that is either a Read with a non-zero byte count or has a PCI flag on.

28. An apparatus comprising:

a data processing system;

a channel in said data processing system a control unit connected to said channel using a protocol which allows for multiplexing operations at the frame level;

computer readable program code for tracking within the channel, the progress of multiple Channel Command Words (CCWs) through their various stages;

computer readable program code for detecting when an error occurs and an operation is aborted;

computer readable program code for selecting which CCW to attempt to retry based on the progress of the multiple CCWs; and said computer readable program code for tracking comprises computer readable program code for keeping track of;
- the last-completed CCW number,
- the last-received CCW number,
- the last-expected CCW number, and
- the last-assigned CCW number.

29. The apparatus of claim 28 further comprising computer readable program code for establishing a checkpoint between the channel and the control unit upon either of the selected CCW being a Read with a non-zero byte count or the selected CCW flags containing a Program Controlled Interruption (PCI).

30. The apparatus of claim 28 further comprising computer readable program code for, when the last-completed CCW number is equal to the last-received CCW number which is equal to the last-expected CCW number, allowing the CCW be selected by the connected control unit.

31. The apparatus of claim 28 further comprising computer readable program code for, when the last-completed CCW number is equal to the last-received CCW number but the last-received CCW number is not equal to the last-expected CCW number, selecting the selected CCW to be the last-received CCW number.

32. The apparatus of claim 28 further comprising computer readable program code for, when the last-completed CCW number is not equal to the last-received CCW number, selecting the CCW to be either;

equal to the last-completed CCW number, or the CCW number greater that the last-completed CCW number which is either a Read with a non-zero byte count or which has a PCI flag on.

33. The apparatus of claim 28 further comprising;

computer readable program code for retrying the selected CCW; and computer readable program code for, in the event said selected CCW retry is unsuccessful, determining a primary CCW address indicating the extent to which the channel completed modifying and accessing storage in the data processing system; and computer readable program code for reporting to the operating system of said data processing system, said primary CCW address.

34. The apparatus of claim 33 further comprising computer readable program code for, when the last-completed CCW number equals the last-received CCW number which is equal to the last-expected CCW number, selecting the primary CCW address reported to the operating system to be the address of the last-assigned CCW number.

35. The apparatus of claim 33 further comprising computer readable program code for, when the last-completed CCW number is equal to the last-received CCW number but the last-received CCW number is not equal to the last-expected CCW number, selecting the primary CCW address reported to the operating system to be either;

the address of the CCW number immediately prior to the last-expected CCW number, or the address of the CCW number which is greater than the last-received CCW number and is the first of such CCW numbers that is either a Read with a non-zero byte count or has a PCI flag on.

36. The apparatus of claim 33 further comprising computer readable program code for, when the last-completed CCW number is not equal to the last-received CCW number, selecting the primary CCW address reported to the operating system to be either;

the address of the last-received CCW number, or the address of the CCW number which is greater than the last-completed CCW number and is the first of such CCW numbers that is either a Read with a non-zero byte count or has a PCI flag on.

\* \* \* \* \*